UNITED STATES PATENT OFFICE.

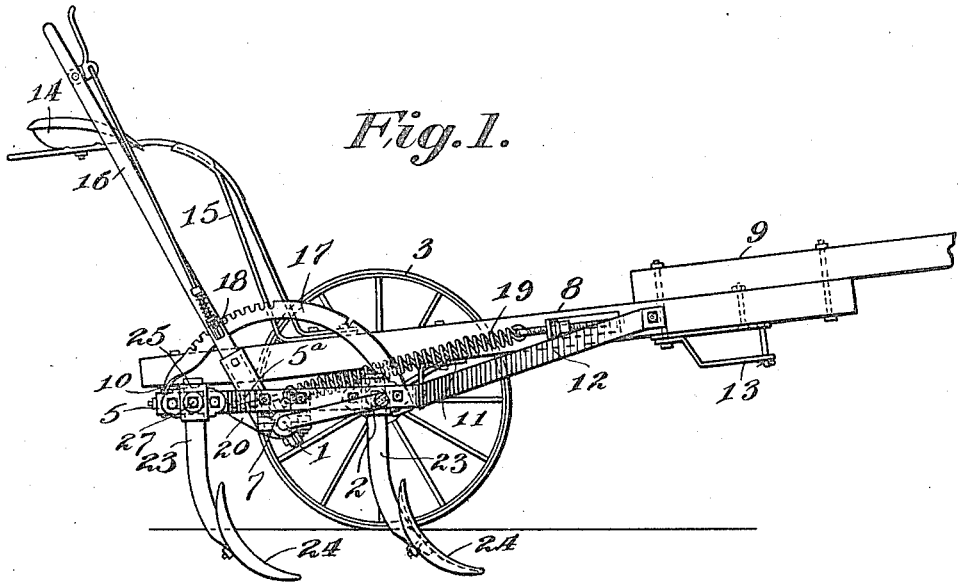
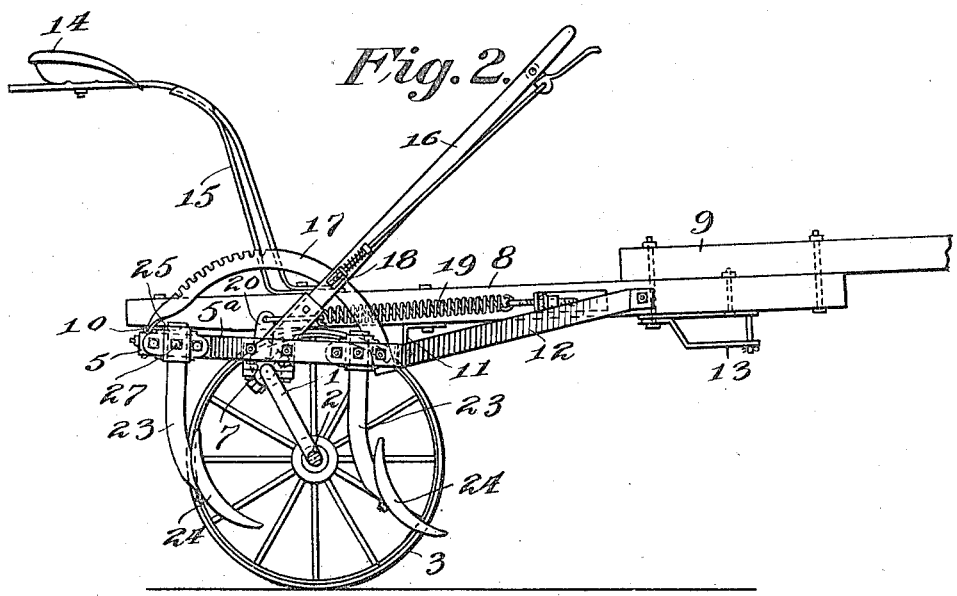

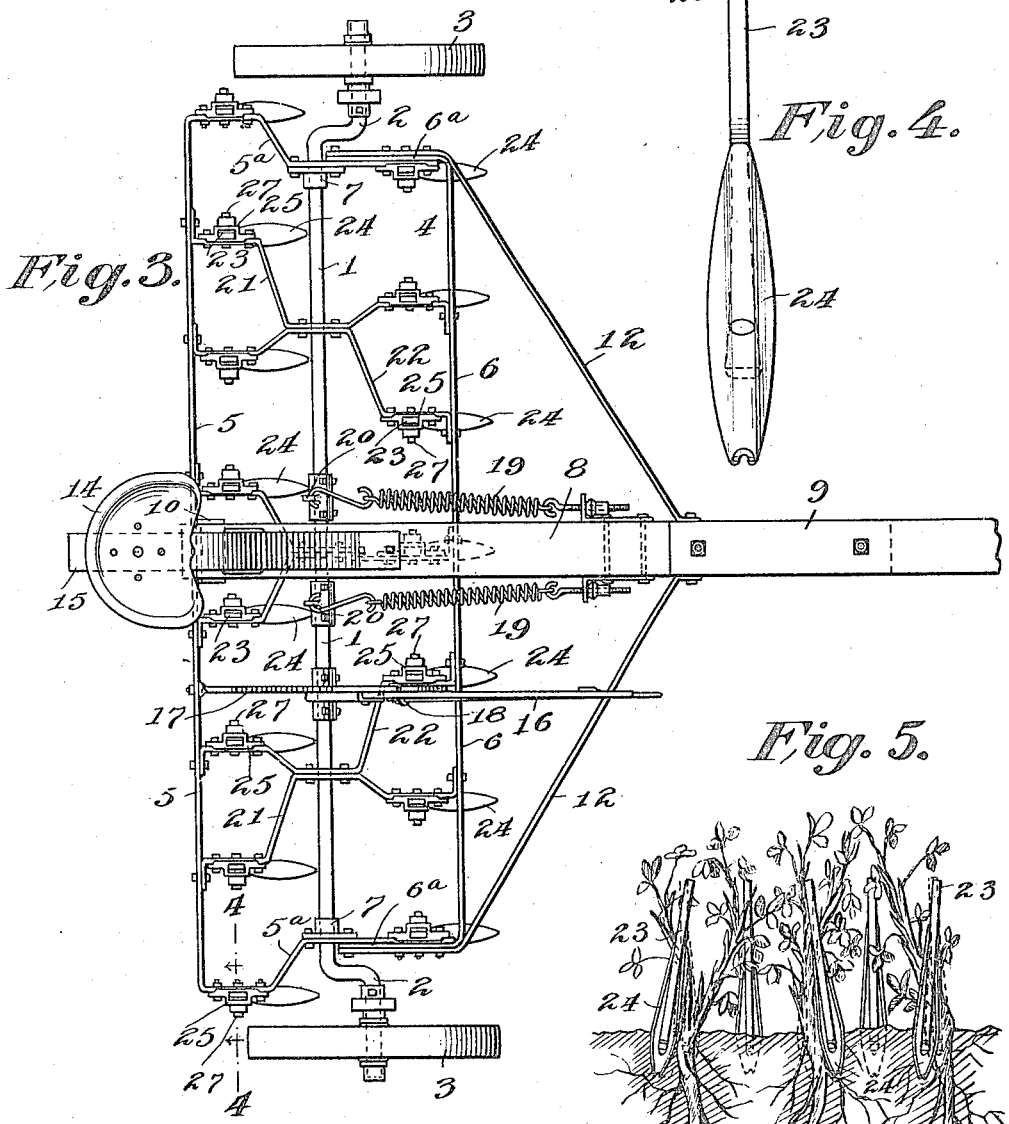

CHARLES E. WHITE, OF MOLINE, ILLINOIS, ASSIGNOR TO DEERE & MANSUR COMPANY, OF MOLINE, ILLINOIS, A CORPORATION OF ILLINOIS.

CULTIVATOR.

1,247,764.  Specification of Letters Patent.  Patented Nov. 27, 1917.

Application filed June 5, 1912. Serial No. 701,817.

*To all whom it may concern:*

Be it known that I, CHARLES E. WHITE, a citizen of the United States, residing at Moline, in the county of Rock Island and State of Illinois, have invented certain new and useful Improvements in Cultivators, of which the following is a specification, reference being had therein to the accompanying drawings.

This invention relates more particularly to cultivators intended and adapted for the renovation of alfalfa. For this purpose it is desirable to have a machine which will loosen the earth between and around the roots and which will scrape the roots themselves without breaking or cutting them.

As shown in the drawings, a machine embodying my invention has a plurality of cultivator shovels or teeth arranged in staggered relationship in two transverse rows. The objects of my invention are to provide in a machine of this class an improved frame construction, improved means for connecting the shovels or teeth to the frame to permit lateral yielding, and improved means for adjusting the position of the frame to regulate and control the action of the shovels or teeth. Other objects will appear in the following specification and claims.

In the drawings—

Figure 1 is a side elevation with the parts adjusted to bring the teeth into operative positions. For the sake of clearness the near ground wheel is not shown.

Fig. 2 is a side elevation similar to Fig. 1 but with the parts adjusted to raise the teeth into inoperative positions.

Fig. 3 is a plan view with the parts in the positions shown in Fig. 2.

Fig. 4 is a detail cross sectional view taken along the line 4—4 of Fig. 3.

Fig. 5 is a fragmentary rear end view of the cultivator in an alfalfa field, the ground being shown in section.

Referring to the drawings, 1 represents the axle which is provided at its ends with cranked or offset portions 2, 2, upon which are rotatably secured the ground wheels 3, 3. 4 represents as a whole the main frame of the machine. This frame is preferably made up of two main bar elements 5 and 6. The rear element 5 comprises a transverse part behind the axle and forward extending side parts 5ª, 5ª at the ends of the transverse part. Each part 5ª is offset toward the center of the machine and near its forward end has secured to it a bearing 7 which is rotatable on the cranked axle 1. The forward frame element 6 has a transverse part in advance of the axle and rearward extending side parts 6ª, 6ª which are secured by means of bolts or otherwise to the corresponding side parts 5ª, 5ª of the element 5.

8 is a central longitudinal bar or pole preferably formed of wood. To this pole 8 is secured the main draft pole 9. The pole 8 is connected by suitable means, such as the brackets 10 and 11, with the elements 5 and 6 of the main frame. Diagonal braces 12, 12 extend to the pole from the ends of the frame. At 13 there is provided a clevis to which can be secured a whiffletree for the attachment of draft animals. A driver's seat 14 is mounted upon the pole 8 by means of a standard 15.

In order that the main frame 4 may be raised or lowered, I provide a hand lever 16 by means of which the crank axle 1 can be rocked with respect to the frame. This hand-lever is rigidly connected to the axle and upon the frame there is provided a notched segment 17 which can be engaged by a hand-controlled latch 18 on the lever to lock the lever and axle in any desired position.

In order to assist the movement of the hand lever 16 in the direction to raise the frame and the parts connected to it, I provide two coil tension springs 19, 19, each connected at its forward end to the pole 8 and each connected at its rear end to an arm 20 rigidly secured to the axle. The tendency of the springs is to turn the axle to lift the frame and this tendency is counteracted by the weight of the frame and the attached parts and the weight of the driver.

Extending in generally longitudinal directions between the two frame elements 5 and 6 are series of bars 21 and 22 arranged in pairs, three pairs being shown in the drawings. The central parts of the bars of each pair are secured together and in front of and behind the said central parts the bars extend first diagonally outward away from each other and then forward and rearward parallel to each other to points of attachment with the frame elements 5 and 6. The bars are so shaped that the forward longitudinal part of each bar is out of alinement with the rear longitudinal part. The rear longitudinal parts of the bars taken with the parts 5ª of the frame form a transverse series of tooth supports and the forward parts of the bars taken with the parts 6ª of the frame element 6 form another transverse series of tooth supports arranged in staggered relationship with the supports of the first series. Secured to each of these tooth supports is a standard 23 which carries at its lower end a tooth 24. The connection between each standard 23 and its support is a resilient one and is clearly shown in Fig. 4. Secured to each support is a bracket 25 provided with a vertical aperture through which the upper end of the standard extends. This aperture is somewhat larger than the standard, a slight movement of the standard being thus possible. A spring 26, held by a bolt 27, serves to normally hold the standard against one side of the aperture. However, the spring permits the standard to move and allow the tooth to swing toward one side or the other when it engages a root.

It will be observed that when the machine is adjusted its parts move about the forward tongue support as a pivot. As a result of this, the teeth of the two transverse rows move through substantially equal distances and there is little or no tendency for one set of teeth to be moved to a level below that of the other. The operator, by means of the hand-lever 16, can raise or lower the frame and with it the teeth to properly adjust the depth of action of the latter.

Each tooth is slightly rounded at its forward end to enable it to easily slip off from and past any roots that it may engage and the rearward and upward curved shape of the tooth causes it not only to lift and loosen the earth, but also to scrape along a considerable portion of any roots in or adjacent its path.

As has been before stated, each tooth can swing laterally toward one side or the other when a root is encountered. This action of the teeth is clearly shown in Fig. 5. The dotted lines show the normal positions of the teeth and the full lines show the positions to which the teeth may be moved by engagement with the roots.

I am aware that cultivators with sharp wide faced shovels having wide bottom cutting edges have been heretofore used with standards combined with a hand lever system for throwing the standards manually outward or inward, and also shifting the shovels, for the purpose of so adjusting the cutting edges that they will not impinge upon the plants but will act to sever weeds or the like.

But in my construction the movements of the teeth laterally are automatic. There is a normal central position for each standard and tooth, and the resilient element, forming part of each working unit, is so adjusted and related to the other parts that the tooth will be held in this normal position until a relatively low lateral pressure is exerted upon it in one direction or the other and will then automatically yield and permit the tooth to swing either to the right or the left as demanded; and then, after it has passed the root or the stalk, this resilient element automatically brings the tooth and its standard back to the line of the working position. And, as above described, this requires no manual operation but results automatically.

I claim—

1. In a renovating cultivator for alfalfa and the like, the combination with a main frame and supporting wheels, of a plurality of non-cutting teeth shaped to provide soil-entering parts adapted to bear laterally against stalks or roots without cutting them, a plurality of drag standards each having one of said teeth secured to its lower end part, and connecting devices for joining to the frame that part of each standard to which its tooth is attached comprising a resilient element adapted to automatically yield and permit the tooth, under relatively low predetermined lateral pressure, to swing in either direction, laterally, away from a normal central working position and adapted to hold the tooth in said central working position until the limit of said pressure is reached and to return the tooth to said central position after such lateral swinging.

2. In a renovating cultivator for alfalfa and the like, the combination with a main frame and supporting wheels, of a plurality of non-cutting teeth shaped to provide soil-entering parts adapted to bear laterally against stalks or roots without cutting them, a plurality of drag standards each of which is rigid from end to end against bending and has one of said teeth secured to its lower end part, and connecting devices between each standard and the frame comprising resilient means supplemental to the standard adapted to automatically yield and permit the tooth under relatively low predetermined lateral pressure to swing in either direction, laterally, away from the normal central working position and to return the tooth to said central position after such lateral swinging and to hold it in said position until the limit of said pressure is reached.

3. In a renovating cultivator for alfalfa and the like, the combination with a main frame and supporting wheels, of a plurality of non-cutting teeth shaped to provide soil-entering parts adapted to bear laterally against stalks or roots without cutting them, a plurality of drag standards each having one of said teeth secured to its lower end part and having a relatively short shank extending approximately vertically upward to the main frame and connecting devices for joining each shank part to the frame with a hinge-like union to permit it to swing laterally and comprising a resilient element adapted to automatically yield and permit the tooth under a predetermined lateral pressure to swing in either direction laterally away from a normal central working position, and adapted to return the tooth to and hold it in said central working position after such lateral swing and until the limit of said pressure is reached.

4. In a renovating cultivator for alfalfa and the like, the combination with the main frame and supporting wheels of a plurality of non-cutting teeth shaped to provide soil-entering parts adapted to bear laterally against stalks or roots without cutting them, a plurality of drag standards each having one of said teeth secured to its lower end part and adapted to have said end part automatically rock laterally in either direction around an approximately longitudinal horizontal axis, and connecting devices for joining each of said drag standards to the frame comprising a resilient element adapted to automatically yield and permit the tooth under a predetermined low pressure to swing in either direction, laterally, away from a normal central working position and adapted to return the tooth to and hold it in said working position until the limit of said predetermined pressure is reached.

5. In a renovating cultivator for alfalfa and the like, the combination with the main frame and supporting wheels of a plurality of non-cutting teeth shaped to provide soil-entering parts adapted to bear laterally against stalks or roots without cutting them, a plurality of drag standards each having one of said teeth secured thereto, and connecting devices for each standard to join it to the frame adapted to hold the tooth against movement vertically or longitudinally in a normal central working position and comprising a resilient element for each standard adapted to permit said tooth to swing in either direction to automatically yield laterally away from said central position and to return the tooth to and hold it in said position after said lateral swing.

In testimony whereof I affix my signature, in presence of two witnesses.

CHARLES E. WHITE.

Witnesses:
 OSCAR F. LUNDAHL,
 ED. W. MEEK.

Copies of this patent may be obtained for five cents each, by addressing the "Commissioner of Patents, Washington, D. C."